United States Patent
Borden, IV et al.

(10) Patent No.: US 6,857,128 B1
(45) Date of Patent: Feb. 15, 2005

(54) ELECTRONIC PROGRAMMING GUIDE BROWSING SYSTEM

(75) Inventors: George Rome Borden, IV, Vancouver, WA (US); Larry Alan Westerman, Portland, OR (US)

(73) Assignee: Sharp Laboratories of America, Camas, WA (US)

( * ) Notice: Subject to any disclaimer, the term of this patent is extended or adjusted under 35 U.S.C. 154(b) by 0 days.

(21) Appl. No.: 09/503,649

(22) Filed: Feb. 14, 2000

(51) Int. Cl.[7] .................. G06F 3/00; G06F 13/00; H04N 5/445; G09G 5/00
(52) U.S. Cl. .............. 725/39; 725/40; 725/43; 725/44; 725/50; 725/52; 725/56; 345/767; 345/784; 345/785; 345/786; 345/787; 345/856; 345/858
(58) Field of Search ............... 725/37–52, 53–56; 345/767, 784–787, 856, 858

(56) References Cited

U.S. PATENT DOCUMENTS

| | | | |
|---|---|---|---|
| 4,706,121 A | | 11/1987 | Young .................. 358/142 |
| 5,479,266 A | | 12/1995 | Young et al. ............ 358/335 |
| 5,479,268 A | | 12/1995 | Young et al. ............ 358/335 |
| 5,677,708 A | * | 10/1997 | Matthews et al. ......... 725/52 |
| 5,781,246 A | * | 7/1998 | Alten et al. .............. 725/40 |
| 5,850,218 A | * | 12/1998 | LaJoie et al. ............ 725/45 |
| 6,005,601 A | * | 12/1999 | Ohkura et al. ........... 725/52 |
| 6,177,931 B1 | * | 1/2001 | Alexander et al. ....... 345/721 |
| 6,201,540 B1 | * | 3/2001 | Gallup et al. ........... 345/764 |
| 6,246,442 B1 | * | 6/2001 | Harada et al. .......... 348/569 |
| 6,262,722 B1 | * | 7/2001 | Allison et al. ............ 725/39 |
| 6,426,779 B1 | * | 7/2002 | Noguchi et al. ......... 348/569 |
| 6,522,342 B1 | * | 2/2003 | Gagnon et al. .......... 345/716 |
| 6,678,891 B1 | * | 1/2004 | Wilcox et al. ............ 725/61 |

\* cited by examiner

*Primary Examiner*—John Miller
*Assistant Examiner*—Michael W. Hoye
(74) *Attorney, Agent, or Firm*—Marger Johnson & McCollom (57) ABSTRACT

An electronic programming guide (EPG) browsing system and method for its operation are disclosed. A viewer navigates this EPG using traditional up, down, left, right commands. But unlike the prior art, which responds to these commands by moving a selection area across a display of program titles, this EPG responds by scrolling the display while leaving the program selection area fixed. This can improve viewer interaction and the display of information for an EPG display, as paging can be avoided and the display scrolling motions correspond with the user's control manipulations. In a preferred embodiment, the program selection area is expanded such that additional details are displayed for a program when it enters the program selection area.

5 Claims, 6 Drawing Sheets

| | 8:00 PM | 8:30 PM | 9:00 PM | 9:30 PM |
|---|---|---|---|---|
| ABC | HOME IMPROVEMENT | THE HUGHLEYS | SPIN CITY | SPORTS NIGHT |
| CBS | JAG | | 60 MINUTES | |
| NBC | 3RD ROCK FROM THE SUN | NEWSRADIO | JUST SHOOT ME | WILL & GRACE |
| WB CA 11 KWBP | BUFFY THE VAMPIRE SLAYER ARRIVAL OF CLOVEN-HOOFED VILLAIN AND BLOODSUCKING SIDEKICK. (R)(TV14-LSV) [CC] | | FELICITY A TERRIFYING ROBBERY SHAKES FELICITY AND BEN. (R)(TVPG-DLV) [CC] | |
| FOX | GUINNESS WORLD RECORDS: PRIMETIME | | THE X-FILES | |
| ESPN | SPORTSCENTER | | TOUR DE FRANCE: STAGE 15 COVERAGE | |
| FX | NYPD BLUE | | BEVERLY HILLS, 90210 | |
| NICK | DOUG | RUGRATS | BRADY BUNCH | THE WONDER YEARS |

|  | 11:00 AM | 11:30 AM | 12:00 PM |
|---|---|---|---|
| 2 | JUDGE(PART 1) | JUDGE(PART 2) | AT NOON |
| 4 | GOLDEN GIRLS | NEWS | INSIDE EDITION |
| 5 | YOUNG & RESTLESS | | NEWS |
| 7 | PERFECT STRA | LOVING | ALL MY CHILD |
| 9 | SESAME STREET | | |
| 13 | ALL MY CHILDREN | | NEWS |
| 44 | EVERYDAY | | MOVIE |
| A&E | LORNE GREEN'S WORLD OF S | | FUGITIVE |
| CNN | NEWS | | NEWS |
| DIS | WALT DISNEY PRESENTS | | LUNCH BOX |
| LIF | JANE WALLACE | | FRUGAL GOURM |
| TNT | MOVIE | | |
| CH 2 | KNTV-FOX | CBL 2 | 11:25 A | TUE APR 3 |

Fig. 1
(Prior Art)

|  | 11:00 AM | 11:30 AM | 12:00 PM |
|---|---|---|---|
| 2 | JUDGE(PART 1) | JUDGE(PART 2) | AT NOON |
| 4 | GOLDEN GIRLS | NEWS | INSIDE EDITION |
| 5 | YOUNG & RESTLESS | | NEWS |
| 7 | PERFECT STRA | LOVING | ALL MY CHILD |
| 9 | SESAME STREET | | |
| 13 | ALL MY CHILDREN | | NEWS |
| 44 | EVERYDAY | | MOVIE |
| A&E | LORNE GREEN'S WORLD OF S | | FUGITIVE |
| CNN | NEWS | | NEWS |
| DIS | DOROTHY BRINGS SOPHIA'S SISTER (NANCY WALKER) OVER FROM SICILY AS A BIRTHDAY SURPRISE | | |
| LIF | | | |
| TNT | | | |
| CH 2 | KNTV-FOX | CBL 2 | 11:25 A | TUE APR 3 |

Fig. 2
(Prior Art)

| | 8:00 PM | 8:30 PM | 9:00 PM | 9:30 PM |
|---|---|---|---|---|
| ABC | HOME IMPROVEMENT | THE HUGHLEYS | SPIN CITY | SPORTS NIGHT |
| CBS | JAG | | 60 MINUTES | |
| NBC | 3RD ROCK FROM THE SUN | NEWSRADIO | JUST SHOOT ME | WILL & GRACE |
| WB | BUFFY THE VAMPIRE SLAYER | | FELICITY | |
| FOX | GUINNESS WORLD RECORDS: PRIMETIME | | THE X-FILES | |
| ESPN | SPORTSCENTER | | TOUR DE FRANCE: STAGE 15 COVERAGE | |
| FX | NYPD BLUE | | BEVERLY HILLS, 90210 | |
| SCI | STAR TREK | | SLIDERS | |
| NICK | DOUG | RUGRATS | BRADY BUNCH | THE WONDER YEARS |
| USA | HERCULES:THE LEGENDARY JOURNEYS | | XENA:WARRIOR PRINCESS | |
| WTBS | BASEBALL: HOUSTON ASTROS AT ATLANTA BRAVES | | POLICE ACADEMY | |

Fig. 3

| | 8:00 PM | 8:30 PM | 9:00 PM | 9:30 PM |
|---|---|---|---|---|
| ABC | HOME IMPROVEMENT | THE HUGHLEYS | SPIN CITY | SPORTS NIGHT |
| CBS | JAG | | 60 MINUTES | |
| NBC | 3RD ROCK FROM THE SUN | NEWSRADIO | JUST SHOOT ME | WILL & GRACE |
| WB | BUFFY THE VAMPIRE SLAYER | | FELICITY | |
| FOX | GUINNESS WORLD RECORDS: PRIMETIME | | THE X-FILES | |
| ESPN | SPORTSCENTER | | TOUR DE FRANCE: STAGE 15 COVERAGE | |
| FX | NYPD BLUE | | BEVERLY HILLS, 90210 | |
| WB CH 32 KWBP | ARRIVAL OF CLOVEN-HOOFED VILLAIN AND BLOODSUCKING SIDEKICK. (R)(TV14-LSV) [CC] | | A TERRIFYING ROBBERY SHAKES FELICITY AND BEN. (R)(TVPG-DLV) [CC] | |

| | 8:00 PM | 8:30 PM | 9:00 PM | 9:30 PM |
|---|---|---|---|---|
| ABC | HOME IMPROVEMENT | THE HUGHLEYS | SPIN CITY | SPORTS NIGHT |
| CBS | JAG | | 60 MINUTES | |
| NBC | 3RD ROCK FROM THE SUN | NEWSRADIO | JUST SHOOT ME | WILL & GRACE |
| WB CA 11 KWBP | BUFFY THE VAMPIRE SLAYER ARRIVAL OF CLOVEN-HOOFED VILLAIN AND BLOODSUCKING SIDEKICK. (R)(TV14-LSV) [CC] | | FELICITY A TERRIFYING ROBBERY SHAKES FELICITY AND BEN. (R)(TVPG-DLV) [CC] | |
| FOX | GUINNESS WORLD RECORDS: PRIMETIME | | THE X-FILES | |
| ESPN | SPORTSCENTER | | TOUR DE FRANCE: STAGE 15 COVERAGE | |
| FX | NYPD BLUE | | BEVERLY HILLS, 90210 | |
| NICK | DOUG | RUGRATS | BRADY BUNCH | THE WONDER YEARS |

Fig. 6

| | 8:00 PM | 8:30 PM | 9:00 PM | 9:30 PM |
|---|---|---|---|---|
| NBC | 3RD ROCK FROM THE SUN | NEWSRADIO | JUST SHOOT ME | WILL & GRACE |
| WB | BUFFY THE VAMPIRE SLAYER | | FELICITY | |
| FOX | GUINNESS WORLD RECORDS: PRIMETIME | | THE X-FILES | |
| ESPN CA 29 | SPORTSCENTER [CC] | | TOUR DE FRANCE: STAGE 15 COVERAGE 173 KM FROM ST. GAUDENS TO PIAU-ENGALY IN THE FRENCH PYRENEES | |
| FX | NYPD BLUE | | BEVERLY HILLS, 90210 | |
| NICK | DOUG | RUGRATS | BRADY BUNCH | THE WONDER YEARS |
| USA | HERCULES:THE LEGENDARY JOURNEYS | | XENA:WARRIOR PRINCESS | |
| WTBS | BASEBALL: HOUSTON ASTROS AT ATLANTA BRAVES | | POLICE ACADEMY | |

| | 8:30 PM | 9:00 PM — 54 | 9:30 PM | 10:00 PM — 90 |
|---|---|---|---|---|
| NBC | NEWSRADIO | JUST SHOOT ME | WILL & GRACE | DATELINE NBC ▶ |
| WB | ◀ BUFFY THE VAMPIRE SLAY | FELICITY | | STAR TREK: NEXT GENERA ▶ |
| FOX | ◀ GUINNESS WORLD RECOR | THE X-FILES | | FOX FILES ▶ |
| ESPN CA 29 | ◀ SPORTSCEN TER [CC] | TOUR DE FRANCE: STAGE 15 COVERAGE 173 KM FROM ST. GAUDENS TO PIAU-ENGALY IN THE FRENCH PYRENEES | | BASEBALL TONIGHT NIGHTLY BASEBALL NEWS AND HIGHLIGHTS ▶ |
| FX | ◀ NYPD BLUE | BEVERLY HILLS, 90210 | | MASH |
| NICK | RUGRATS | BRADY BUNCH | THE WONDER YEARS | I LOVE LUCY |
| USA | ◀ HERCULES: THE LEGENDA | XENA:WARRIOR PRINCESS | | WALKER: TEXAS RANGER ▶ |
| WTBS | ◀ BASEBALL: HOUSTON ASTR | POLICE ACADEMY | | ▶ |

Fig. 7

| | 8:00 PM — 122 | 8:30 PM — 54 | 9:00 PM | 9:30 PM — 120 |
|---|---|---|---|---|
| ESPN | SPORTSCENTER | | TOUR DE FRANCE: STAGE 15 COVERAGE | |
| FX | NYPD BLUE | | BEVERLY HILLS, 90210 | |
| NICK | DOUG | RUGRATS | BRADY BUNCH | WONDER YEARS |
| USA CA 25 | HERCULES: THE LEGENDARY JOURNEYS MONSTROUS BATTLE (TVPG-V) [CC] | | XENA:WARRIOR PRINCESS HARD-HEARTED KING REFORMS (TVPG-V) [CC] | |
| WTBS | ◀ BASEBALL: HOUSTON ASTROS AT ATLANTA BRAVES | | POLICE ACADEMY | |
| ABC | HOME IMPROVEMENT | THE HUGHLEYS | SPIN CITY | SPORTS NIGHT |
| CBS | JAG | | 60 MINUTES | |
| NBC | 3RD ROCK FROM THE SUN | NEWSRADIO | JUST SHOOT ME | WILL & GRACE |

| | 8:00 PM | 8:30 PM | 9:00 PM | 9:30 PM |
|---|---|---|---|---|
| ABC | HOME IMPROVEMENT | THE HUGHLEYS | SPIN CITY | SPORTS NIGHT |
| CBS | JAG | | 60 MINUTES | |
| NBC | 3RD ROCK FROM THE SUN | NEWSRADIO | JUST SHOOT ME | WILL & GRACE |
| WB | BUFFY THE VAMPIRE SLAYER | | FELICITY | |
| FOX | GUINNESS WORLD RECORDS: PRIMETIME | | THE X-FILES | |
| ESPN | SPORTSCENTER | | TOUR DE FRANCE: STAGE 15 COVERAGE | |
| FX | NYPD BLUE | | BEVERLY HILLS, 90210 | |
| WB CH 32 KWBP | ARRIVAL OF CLOVEN-HOOFED VILLAIN AND BLOODSUCKING SIDEKICK. (R)(TV14-LSV) [CC] | | A TERRIFYING ROBBERY SHAKES FELICITY AND BEN. (R)(TVPG-DLV) [CC] | |

Fig. 10

| | WTBS | ABC | CBS | NBC/CH 8 KOIN | WB | FOX | ESPN | FX |
|---|---|---|---|---|---|---|---|---|
| 6:00 PM | | | | NEWS | | | | [CC] |
| 6:30 PM | | | | NBC NEWS | | | | [CC] |
| 7:00 PM | | | | EXTRA (TVPG) | | | | [CC] |
| 7:30 PM | | | | HOLLYWOOD SQUARES (TVPG) | | | | |
| 8:00 PM | | | | 3RD ROCK FROM THE SUN (TV14) | | | | [CC] |
| 8:30 PM | | | | NEWSRADIO DAVE'S ALMA MATER. (R) (TVPG) | | | | [CC] |
| 9:00 PM | | | | JUST SHOOT ME (R) (TVPG) | | | | [CC] |
| 9:30 PM | | | | WILL & GRACE (R) (TVPG) | | | | [CC] |
| 10:00 PM | | | | DATELINE NBC | | | | [CC] |
| 10:30 PM | | | | | | | | |
| 11:00 PM | | | | NEWS | | | | [CC] |
| 11:30 PM | | | | TONIGHT SHOW (TV14) | | | | [CC] |

ELECTRONIC PROGRAMMING GUIDE BROWSING SYSTEM

FIELD OF THE INVENTION

This present invention relates to electronic programming guides, and more particularly to a method and apparatus for interactively formatting electronic program guide information for display to a viewer.

BACKGROUND OF THE INVENTION

An electronic program guide (EPG) displays television programming information, on an attached television display, to a viewer. The hardware that creates the EPG display may reside within the television receiver, a video recorder, a cable TV set-top box, or it may be a separate unit. When the EPG display is activated, it allows a viewer to view programming information and interactively manipulate the displayed programming information with a remote control.

Figure 1:
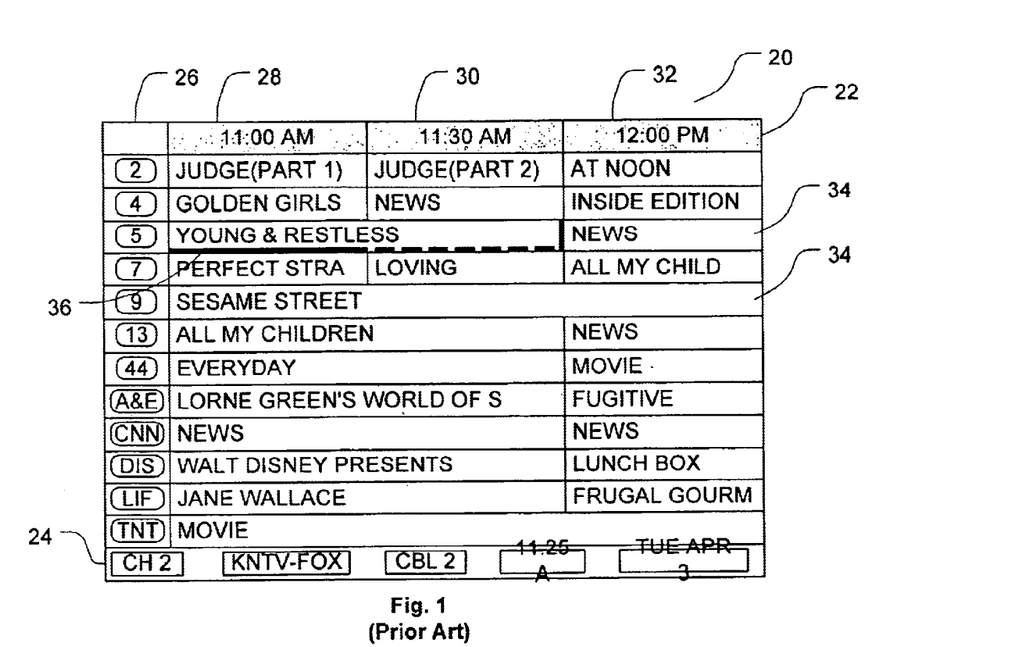
FIGS. 1 and 2 illustrate the operation of a prior art EPG system.
Figure 2:
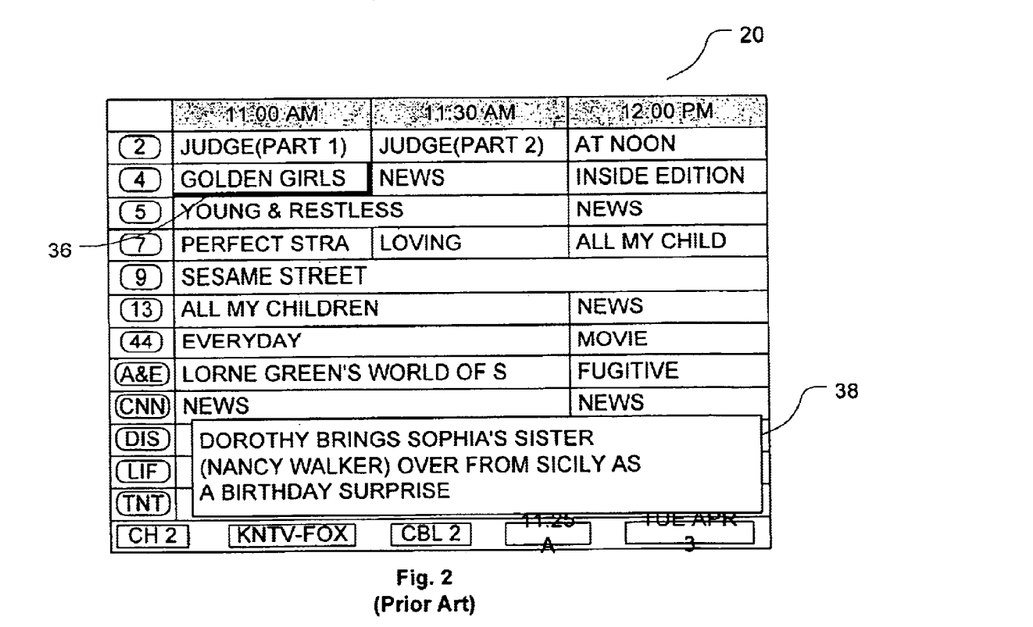

FIGS. 1 and 2 illustrate a basic EPG display 20 as disclosed in U.S. Pat. No. 5,479,268, "User Interface for Television Schedule System", issued Dec. 26, 1995, to Patrick Young et al. EPG display 20 is arranged as three columns 28, 30, 32, of cells one-half hour in duration, and twelve rows, each row corresponding to one channel listing in channel column 26. Time row 22 indicates broadcast time slots for each of columns 28, 30, and 32. A status row 24 shows details for the currently tuned channel, time, date, etc. Program cells 34 occupy one or more horizontally adjacent column cells, depending on the length of the program, and display a title indicating the program scheduled in that time slot.

A viewer selects channels for tuning, recording, etc. using a cursor control on their remote control. The cursor control moves a visible cursor 36 on EPG display 20. For instance, in FIG. 1 cursor 36 highlights the one-hour cell corresponding to the 11:00 and 11:30 AM timeslots on channel 5, for the program "The Young and the Restless". In FIG. 2, the cursor has been moved up a row, highlighting the half-hour show "Golden Girls" on channel 4 at 11:00 AM.

Part of the invention of the '268 patent relates to the appearance and size of cursor 36. Instead of a cursor that jumps from program to program each time a viewer manipulates the cursor control sideways, the '268 patent uses a cursor that follows the underlying grid of cells corresponding to columns 28, 30, and 32. Thus a viewer who depressed a cursor right control while viewing the display of FIG. 1 would still be selecting the same program—but the solid portion of the cursor would move to the 11:30 AM time slot. On the other hand, a viewer who depressed the cursor right control while viewing the display of FIG. 2 would select a new program "News" at the 11:30 AM time slot. This cursor control mechanism is claimed to avoid abrupt changes in the screen appearance that are disconcerting to viewers, particularly where the cursor would move off the display unexpectedly and "page" to a new section of the EPG database.

A second feature of the '268 patent is also shown in FIG. 2. By pressing a button on their remote, a viewer can activate a program note overlay 38 containing details about the currently selected program. Depending on where the cursor appears o the display, the program note overlay 38 will appear either near the bottom or near the top of display 20.

SUMMARY OF THE INVENTION

According to one aspect of the invention, a method for displaying an electronic program guide to a viewer is disclosed. The method comprises displaying multiple channel identifiers and multiple time slot identifiers on a display. Multiple program titles are also displayed, with each program title located in a display area corresponding to the displayed channel identifier of the channel carrying the program and the displayed time slot identifier corresponding to the time slot of the program. A program selection area, corresponding to a predefined selection region of the display, is fixed. In response to viewer requests, the program titles on the display are scrolled, thus changing the program corresponding to the fixed program selection area.

BRIEF DESCRIPTION OF THE DRAWING

The invention may be best understood by reading the disclosure with reference to the drawing, wherein.

DETAILED DESCRIPTION OF THE PREFERRED EMBODIMENTS

The roving cursor of the prior art, even with the improvements of the '268 patent, has several undesirable features. First, the paging operation can be confusing, since when it pages, the EPG moves large amounts of information with no visual cue. Because it is free to roam the entire display, the roving cursor requires that the viewer perform a visual search to locate the new cursor position each time the display pages. And when the cursor nears an edge of the display, the viewer cannot see some of the cells adjacent to the cursor until a paging operation is performed. Also, when the program note overlay is used, the distance between the overlay and the selected program changes as the cursor is moved, and requires the viewer to shift their focus between the two by a changing spacing in order to navigate and read notes. Cursor movement-induced shifts in program note overlay position also hide cells and can be disconcerting to the viewer. A viewer can also be confused because some cursor movement operations seem to produce little or no change in the display.

The disclosed embodiments of the present invention can improve viewer interaction and the display of information for an EPG display. Instead of a roving cursor and a two-position program note overlay, a preferred embodiment of the present invention uses a stationary selection area and a selectable but stationary program note display area. The viewer in essence "scrolls" the EPG display to manipulate programs into the selection area. Each scroll can be accompanied by a visual scrolling cue or animation. Because the location of the selection area is constant and in a constant relationship (preferably adjacent) to the program note display area, the viewer need not search for these areas after every control manipulation. Further, a viewer wishing to select a program need only focus their view on that program and move it towards the selection area-all movements of the display can correspond with the viewer's control manipulation, making it easy for the viewer to follow information movement.

The following terms and definitions will be adhered to for purposes of this disclosure. As used herein, a scrolling operation partially displaces an existing display of program titles, preferably by one "row" or "column", although scrolling may encompass more than simple pixel-to-pixel copy or shift operations. Scrolling also may appear either as fluid motion or as a step. In contrast, a paging operation typically displaces at least half of an existing display of program titles (e.g., a "half-page"). A video-compatible output may take one of many forms, depending on the capabilities of the video system: It may comprise, e.g., a baseband NTSC or PAL analog signal, separate RGB signals, a digital signal such as an HDTV or MPEG bitstream, a bitmap, or even a set of instructions for rendering a displayable picture.

The preferred embodiments disclosed below were selected by way of illustration and not by way of limitation. Referring to FIGS. 3–9, representative EPG displays are shown for several embodiments of the present invention.

Figure 3:
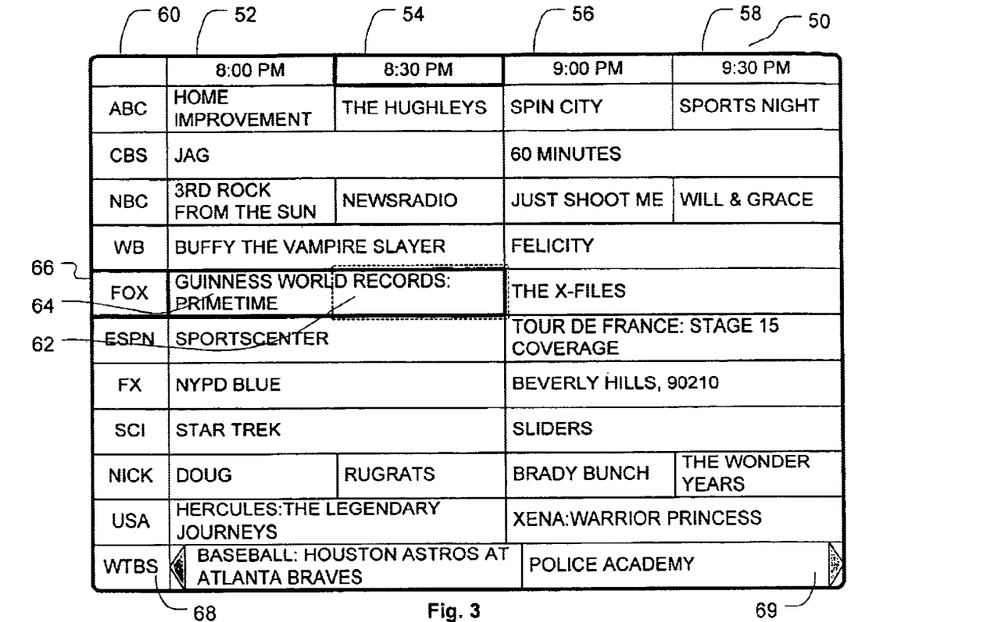
FIGS. 3, 4, and 5 illustrate the display appearance for three EPG display modes according to embodiments of the invention.

FIG. 3 shows a basic EPG display 50 according to one embodiment. Columns 52, 54, 56, and 58 correspond to the four temporally consecutive time slots shown in the column headings, and column 60 contains channel identifiers, each corresponding to a row of that channel's programming. The remainder of display area 50 contains program titles, each title displayed in a box aligned with its broadcast channel and broadcast time. If a program occupies more than one time slot, its box will occupy the appropriate number of time slots, and if its broadcast time is not entirely within the range of time slots currently displayed, a continuation is indicated by an arrow 68 or 69. Note that the start time for "Police Academy" (see arrow 69) is not aligned with the beginning of a time slot, and therefore its box is offset to its true start time.

One "cell" 62 of the display area corresponds to a program selection area. Cell 62 is indicated by a dashed line in FIG. 3, although on an actual display the program selection area location is preferably hidden. Instead, the user sees a highlight indication, such as a thicker border, a different background color, and/or a different text color, of the program 64 overlying the program selection area (the program selection area also can be identified as shown by similarly highlighting the channel identifier 66 and time slot 54 corresponding to the program selection area). By first moving a desired program into the program selection area, the user can perform functions such as channel selection, VCR tape setup, or query functions for that program.

Preferably, the location of the program selection area is fixed in both display dimensions. As the user manipulates up/down navigation controls, the display scrolls vertically to align a different channel identifier with the program selection area display row. As the user manipulates left/right navigation controls, the display scrolls horizontally to align a different time slot with the program selection area column. Although the user may be provided a function for changing the preferred location of program selection area 62 on display 50, a position near the center of display 50 allows the user to view program titles in the peripheral areas of the display before shifting them into the program selection area. The scrolling/display refresh operations can then avoid some of the disorientation that can result with prior art systems that have a fixed/paging display with a roving cursor.

Figure 4:
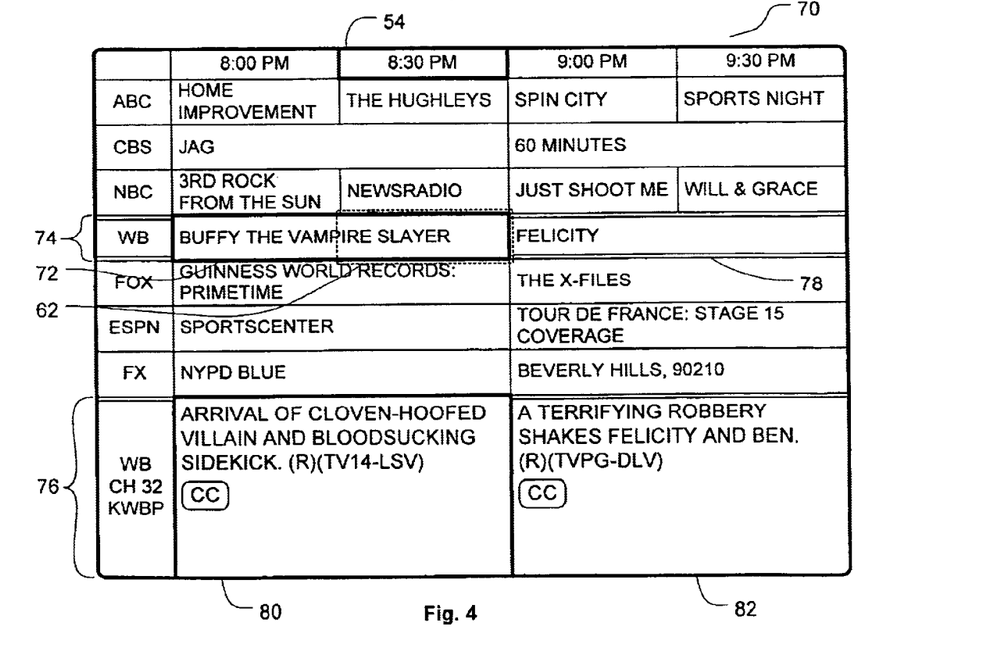

Referring to FIG. 4, an EPG display 70 according to a second embodiment of the invention is shown. In display 70, the scrollable program title area is reduced in size to allow for a program details area 76. Program details area 76 contains expanded information for the program selection area row 74. For instance, the channel information box in area 76 can display additional information about the channel identifier of row 74. Program description areas 80 and 82 correspond to the program titles currently on the selection row, i.e., titles 72 and 78. Each description area contains additional information about the corresponding program title, such as a short description of the program's content, whether it is a repeat, whether it is closed captioned, and what the program's rating is. Secondary information such as whether the program is set for taping, has been taped, etc., can also be displayed in this area.

Figure 5:
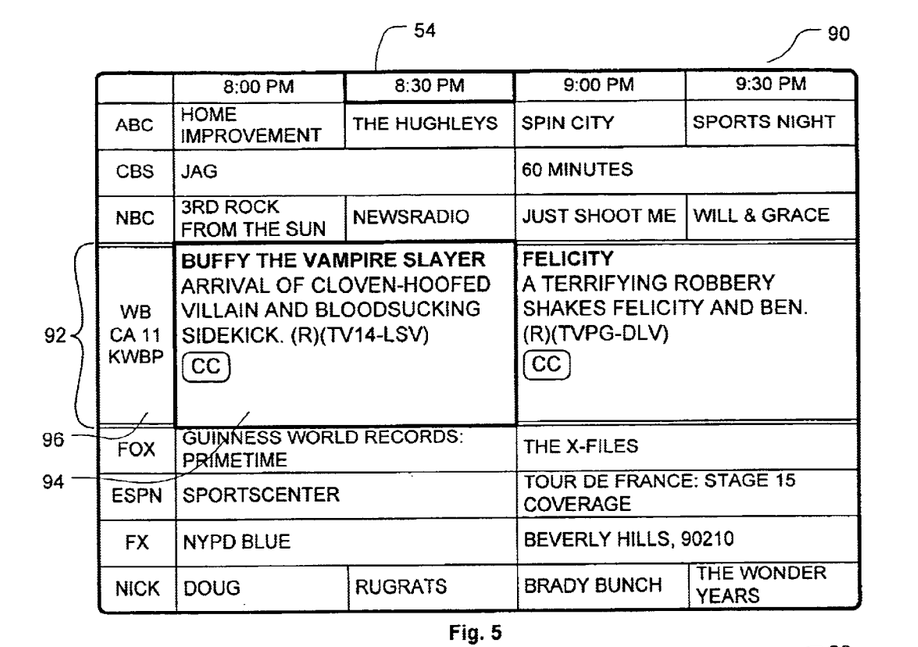

FIG. 5 depicts an EPG display 90 according to a third embodiment wherein the program details area and the program selection area are integrated in a single area 92. As a program title is scrolled into area 92, the details associated with the program title are automatically displayed. Thus, in FIG. 6, a user has, starting from the display of FIG. 5, scrolled the display up two rows such that the program originally appearing in program selection area 94, with details, now appears in cell 102 without details. Meanwhile, area 92 now shows the details for the currently selected channel and its corresponding programming.

Figure 6:
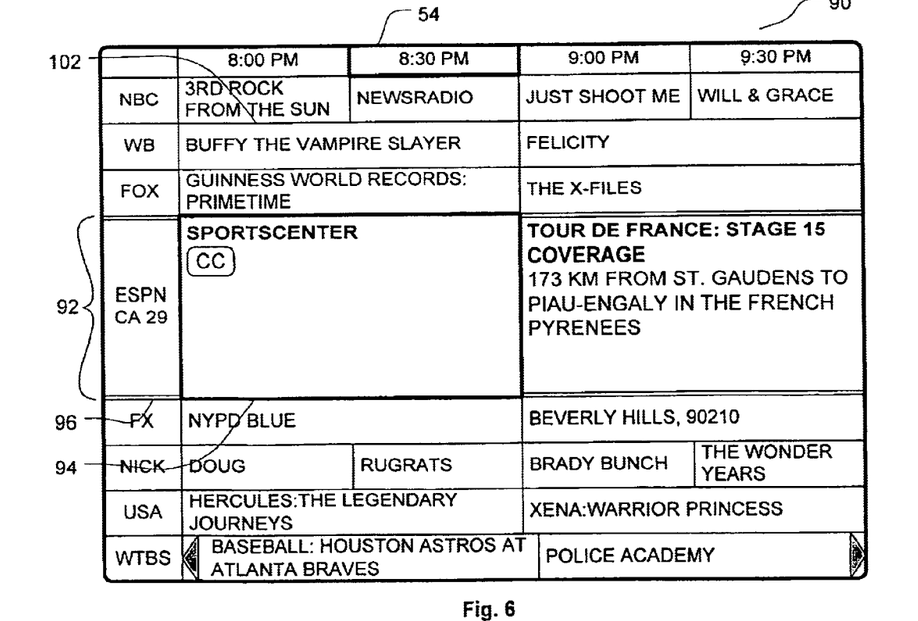
FIGS. 6 and 7 illustrate the display appearance for the EPG display mode shown in FIG. 5, after display manipulation by a viewer.
Figure 7:
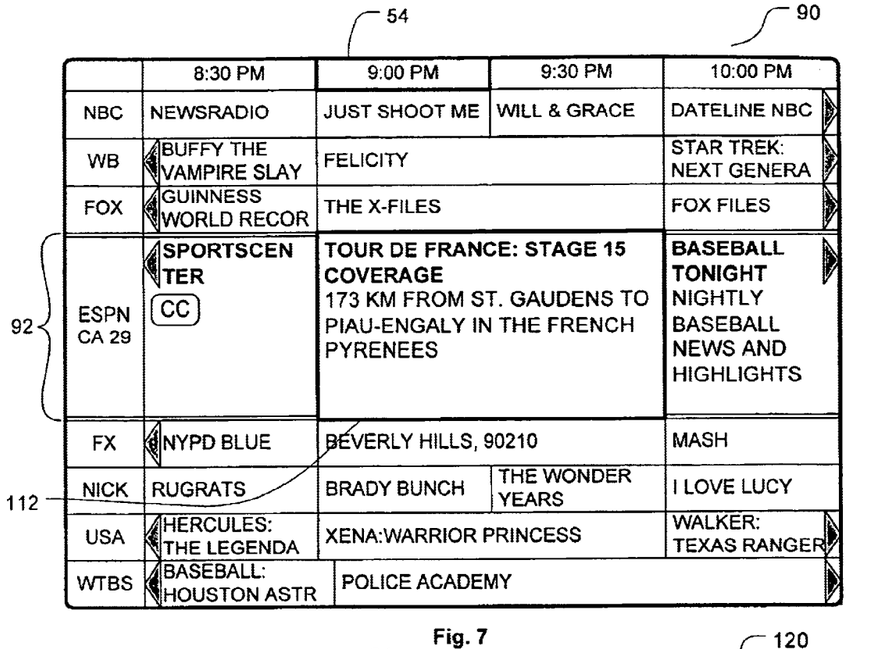

FIG. 7 shows EPG display 90 after the user has scrolled the display one time slot left from the display of FIG. 6. Program selection column 54 now contains the 9:00 PM timeslot. The selected program 112 occupies the two middle timeslots of the display, instead of the left two timeslots of the previous display. Note that if more than one program overlaps the selection cell (e.g., because of an offset start time), the EPG can select the program with the greatest overlap as the selected program.

Figure 8:
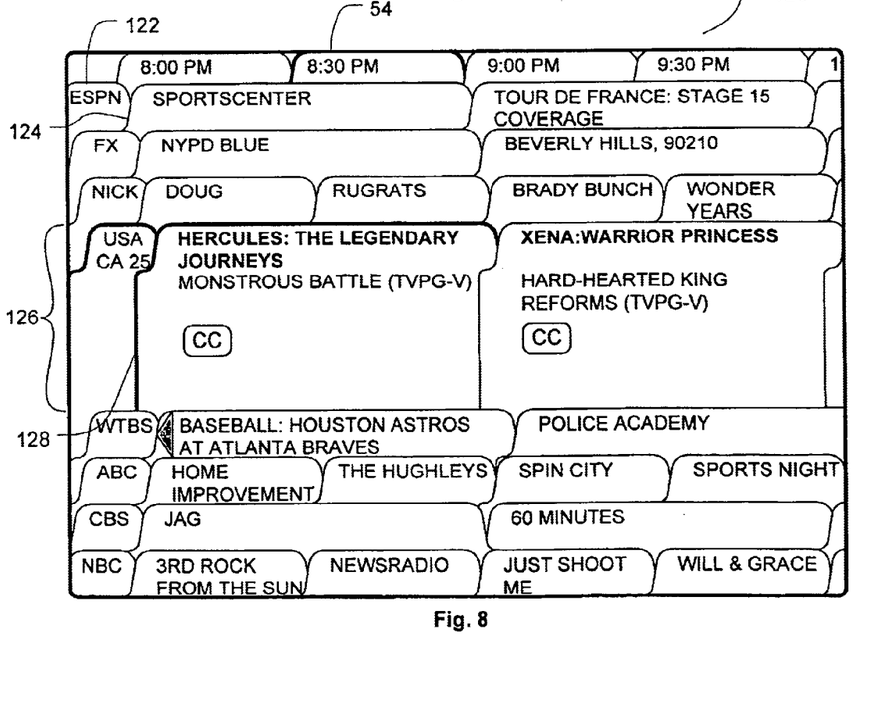
FIGS. 8 and 9 show the display appearance for two different three-dimensional appearance EPG display modes according to embodiments of the invention.

A display according to the present invention need not present information in a boxed row-column format. A variety of three-dimensional appearance formats can be used to aid user comprehension or just to make the display more visually appealing. For instance, FIG. 8 shows an EPG display 120 that displays programming with the appearance of a stack of file cards. The top row of file cards displays timeslots (e.g., 54) and the left row of file cards (e.g., 122) displays channel identifiers. Each program title is displayed on a file tab (e.g., 124), with the width and position of the filetab corresponding to the run-time, start time, and channel identifier of that program title.

In one display mode (not shown) analogous to FIG. 3, only the file tabs 124 are shown for the programs, and no program details are displayed. In the display mode shown in FIG. 8, the program details are displayed for the row of cards 126 corresponding to the program selection area, and the card 128 overlapping the program selection area is highlighted. Preferably, the user can toggle between these display modes.

When the user signals the EPG to scroll, the three-dimensional stack of cards moves accordingly. For instance, if the display is scrolled up, the cards can appear to flip as if they were attached to a rotary desk file. Or, the cards can move like files being lifted from a file cabinet, e.g., the next row of tabs can move up until only the tabs show on the previously selected row of cards, as the whole display scrolls up slowly.

Figure 9:
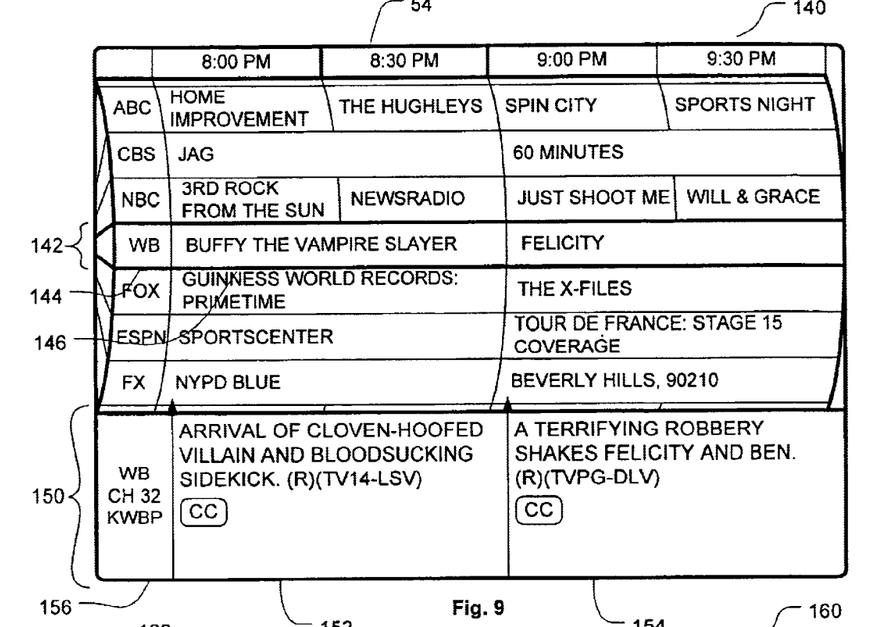

FIG. 9 illustrates another three-dimensional EPG appearance 140 according to an embodiment of the invention. Program information in EPG 140 is arranged along the rim of what appears to be a large "wheel". The appearance of the rim of a wheel viewed in perspective can be achieved by offsetting time slot information in adjacent rows elliptically as shown. Also, the slant of the font can be varied, lighting/shading can be varied across the wheel, and other similar visual (and/or audible) effects can be used to enhance the illusion of a moveable wheel.

Preferably, the program selection row 142 is placed on the wheel where the rim is "parallel" to the plane of the EPG display as shown. Wheel sector 144 indicates the selected channel identifier, and time slot identifier 54 is aligned with the rim sector corresponding to Ira the selection area. The program title 146 overlapping the program selection area is highlighted. Below the wheel, a program details area 150 can be displayed with a channel details area 156 and corresponding program details areas 152 and 154.

When the user selects up or down navigation, scrolling can be animated through wheel rotation, with program details displayed for programs as they pass program selection row 142. Left/right scrolling can also use animation, e.g., by dropping out a time slot sector of the wheel and sliding the wheel over until the next time slot is visible.

Figure 10:
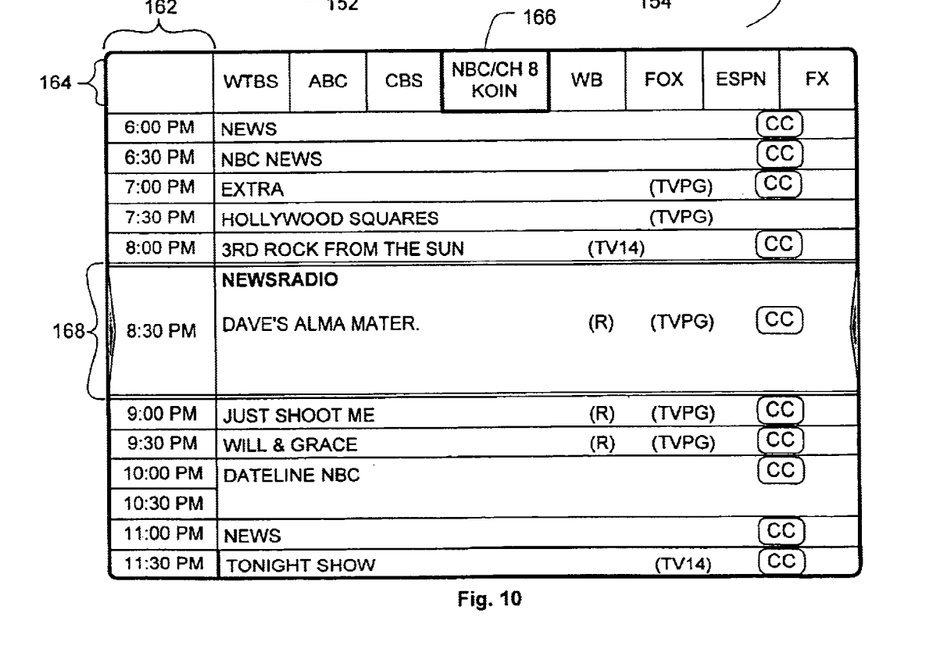
FIG. 10 shows the display appearance for an EPG display mode according to yet another embodiment of the invention.

FIG. 10 illustrates an EPG display 160 for an alternate embodiment of the invention. In this embodiment, timeslots are arranged down column 162, and channel identifiers are arranged across row 164. Channel identifier 166 is highlighted to indicate that the displayed program titles correspond to that channel. Program selection row 168 contains expanded information for the program corresponding to the timeslot aligned with the selection row.

In operation, when the user selects up or down navigation, the timeslots and programs will scroll accordingly to place a new program in program selection row 168. When the user selects left or right navigation, the channel identifiers in row 164 will scroll to place a new channel identifier at location 166, and the programs for that channel identifier will be displayed. Although a two-dimensional display is shown in FIG. 10, three-dimensional effects can also be combined with this embodiment.

Figure 11:
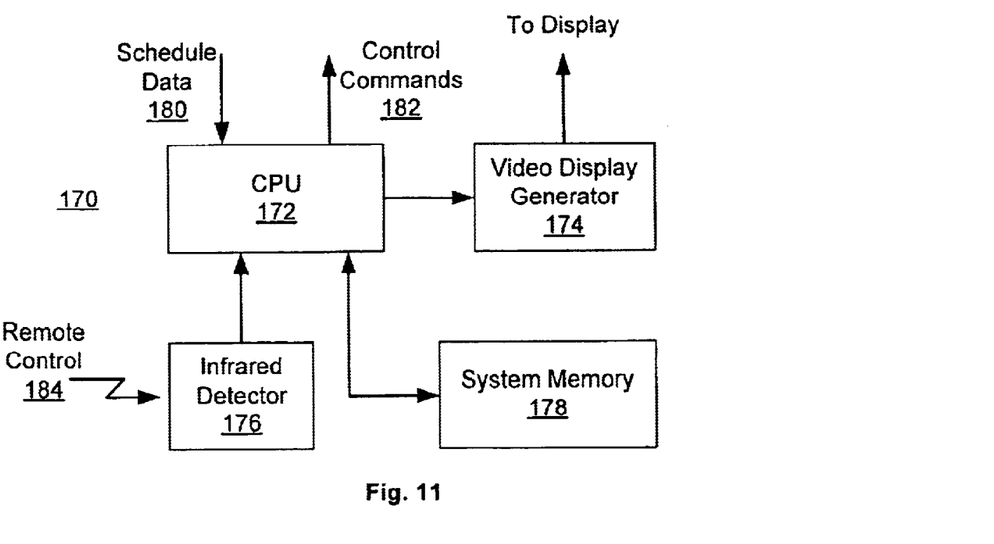
FIG. 11 shows in block diagram form an EPG display system according to an embodiment of the invention.

The present invention can be embodied in many appliances, including a cable-TV set top box, a VCR, a television receiver, or an add-on appliance. FIG. 11 shows the components included in a typical EPG display system embodiment 170. A CPU 172, e.g., a programmed microprocessor or digital signal processor, performs the bulk of the logical functions of system 170. A system memory 178, e.g., random access semiconductor memory (RAM), stores schedule information, and may store graphical data used to render screen displays. Some user control means, such as infrared detector 176 (or front-panel or wired remote controls, not shown) is provided to allow a user to control the system. And video display generator 174 outputs a video-compatible electronic programming schedule display.

CPU 172 is coupled to system memory 178, video display generator 174, and infrared detector 176, as well as to several outside signals. During operation, CPU 172 receives schedule data 180 (e.g., program start/stop times, channel identifier, program details) from an external source, and stores this data to system memory 178. The processor responds to commands received via infrared detector 176, e.g., by issuing control commands 182 to an external system such as a tuner or VCR (not shown), by changing the content or appearance of the formatted information it supplies to video display generator 174, or both.

In responding to control commands, CPU 172 will typically reference the program information for the program appearing in the program selection area of the display. For instance, if a user issued a "record program" command, CPU 172 can respond by retrieving channel, start time, and stop time for the program, and can even check for recording conflicts. Assuming no conflicts exist, a control command 182 is issued to an attached VCR timer (not shown) to program it to record the channel at the designated time, and the record command is stored to system memory 178 for future reference.

In responding to display manipulation commands, CPU 172 will typically retrieve schedule information from system memory 178 and format this information appropriately before supplying it to video display generator 174. For instance, video display generator 174 may comprise a video RAM (VRAM) that CPU 172 stores bitmap information into. CPU 172 retrieves the information needed for the current display, e.g., program titles and details that are visible with the currently displayed range of timeslots and channel identifiers. CPU 172 then displays this information by generating a bitmap of formatted information and storing this bitmap to the VRAM in video display generator 174.

The various display screen appearances and scrolling effects described in conjunction with FIGS. 3–10 can be implemented by applying known computer graphics techniques to a particular arrangement of the schedule data by CPU 172. For instance, when a user issues a IiF command that requires display scrolling, CPU 172 (or video display generator 174 if equipped for bitmap manipulation) can cause appropriate portions of the formatted bitmap to smoothly scroll at a predetermined rate.

Figure 12:
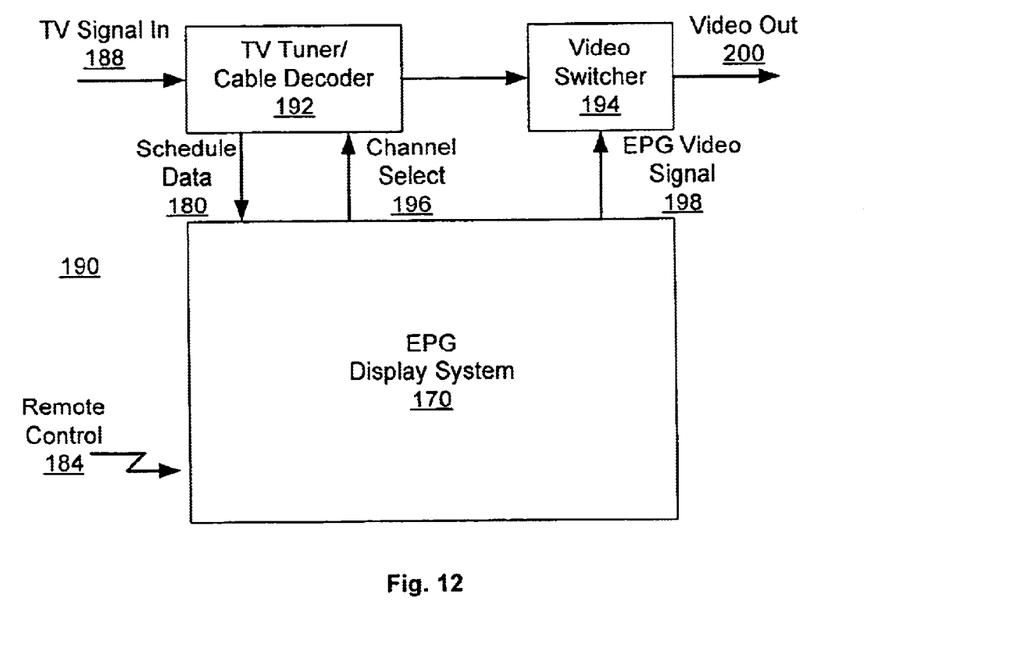
FIG. 12 shows in block diagram form an television tuner incorporating the EPG display system of FIG. 11.

FIG. 12 shows an EPG display system 170 connected in a tuner 190, which may, e.g., reside in a VCR, a television receiver, or a set-top box. A TV tuner/cable decoder 192 receives a TV signal 188, which may comprise multiple VHF and UHF broadcast signals, cable broadcast signals, etc. In a typical application, schedule data 180 is piggybacked on the received TV signal, and tuner/decoder 192 extracts this data and supplies it to EPG display system 170. Tuner/decoder 192 also demodulates one (or more) of the RF signals corresponding to a selected channel identifier.

Remote control 184 operates EPG display system 170 as described above. When the user issues a command that requires a channel change, EPG display system 170 issues a channel select signal command 196, causing tuner/decoder 192 to demodulate a different RF signal according to signal 196.

Video switcher 194 selects video out signal 200. Normally, the output of tuner/decoder 192 is selected as video out signal 200. When the user activates EPG display system 170, video switcher 194 selects EPG video signal 198 as video out signal 200.

Although most or all of the functionality of the embodiments of the present invention can be implemented in special-purpose hardware, it is more preferable that a programmable processor be used with an EPG program. Such a program can partition EPG functionality into several modules—for instance, a program schedule information manager can handle storage and retrieval of program schedule information from an EPG database, a display scroll controller can respond to externally-generated program guide step navigation commands by calculating an updated viewable subset of the program schedule information, and a program schedule information formatter can take the viewable subset and format it for display.

One of ordinary skill in the art will recognize that the concepts taught herein can be tailored to a particular application in many advantageous ways. For instance, the program selection area can remain fixed in one direction only, i.e., constrained to one row of the display but allowed to move freely from column to column. One or more of the disclosed display embodiments can be combined with others of the embodiments, or with other display modes, in a selectable display system. Such minor modifications are encompassed within the invention, and are intended to fall within the scope of the claims.

What is claimed is:

1. A method for displaying an electronic program guide to a viewer, the method comprising:

displaying multiple channel identifiers on a display;

displaying multiple time slot identifiers on the display;

displaying multiple program titles on the display, each program title located in a display area corresponding to the displayed channel identifier of the channel carrying the program and the displayed time slot identifier corresponding to the time slot of the program;

fixing a program selection area corresponding to a predefined selection region of the display;

scrolling the program titles on the display in response to viewer requests, thereby changing the program corresponding to the program selection area;

displaying program details for the program appearing in the selection region in a program details area of the display, and updating the program details when a different program title is scrolled into the selection region; and simultaneously displaying program detail for multiple programs corresponding to the displayed channel identifier of the program appearing in the selection region, the program details for each one of the multiple programs displayed in a section of the program details area corresponding to that program's time slot.

2. The method of claim 1, wherein the selection region and the program details area appear as a single area.

3. The method of claim 2, wherein the single area is approximately centered in one dimension of the display.

4. A method for displaying an electronic program guide to a viewer, the method comprising:

displaying multiple channel identifiers on a display;

displaying multiple time slot identifiers on the display;

displaying multiple program titles on the display, each program title located in a display area corresponding to the displayed channel identifier of the channel carrying the program and the displayed time slot identifier corresponding to the time slot of the program;

displaying the program titles in bounded display areas resembling a three-dimensional stack of file tabs, and scrolling the program titles comprises manipulating the stack to create the appearance of the display of file contents for a file tab when the file tab is scrolled into the selection region;

fixing a program selection area corresponding to a predefined selection region of the display;

scrolling the program titles on the display in response to viewer requests, thereby changing the program corresponding to the program selection area; and displaying program details for the program appearing in the selection region in a program details area of the display, and updating the program details when a different program title is scrolled into the selection region.

5. The method of claim 4, wherein the width and position of a file tab correspond to the run-time and start time of the program whose title is displayed in the file tab.

* * * * *